United States Patent
Kinjo

(10) Patent No.: US 7,092,569 B1
(45) Date of Patent: Aug. 15, 2006

(54) METHOD AND DEVICE FOR EXTRACTING SPECIFIED IMAGE SUBJECTS

(75) Inventor: Naoto Kinjo, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 483 days.

(21) Appl. No.: 09/630,315

(22) Filed: Jul. 31, 2000

(30) Foreign Application Priority Data

| Jul. 29, 1999 | (JP) | 11-214548 |
| Sep. 6, 1999 | (JP) | 11-251347 |

(51) Int. Cl.
*G06K 9/46* (2006.01)
*G06K 9/66* (2006.01)

(52) U.S. Cl. .......... 382/190; 382/170; 382/171; 382/224; 382/282; 382/304

(58) Field of Classification Search ......... 382/115, 382/116, 117, 118, 190, 195, 203, 220–226, 382/228, 282, 288, 302–305, 164–165, 170–172; 358/453; 706/20
See application file for complete search history.

(56) References Cited

U.S. PATENT DOCUMENTS

| 5,278,921 A | | 1/1994 | Nakamura et al. | |
| 5,299,284 A | * | 3/1994 | Roy | 706/20 |
| 5,432,863 A | * | 7/1995 | Benati et al. | 382/167 |
| 5,629,752 A | * | 5/1997 | Kinjo | 382/274 |
| 5,923,779 A | * | 7/1999 | Ohmi et al. | 382/190 |
| 5,930,391 A | * | 7/1999 | Kinjo | 382/173 |
| 6,040,860 A | * | 3/2000 | Tamura et al. | 348/252 |
| 6,697,503 B1 | * | 2/2004 | Matsuo et al. | 382/118 |

FOREIGN PATENT DOCUMENTS

| JP | 04-346332 A | 12/1992 |
| JP | 06-067320 A | 3/1994 |
| JP | 08-122944 A | 5/1996 |
| JP | 08-184925 A | 7/1996 |
| JP | 09-138471 A | 5/1997 |

OTHER PUBLICATIONS

Saber et al, "Face Detection and Facial Feature Extraction Using Color, Shape and Symmetry-based Cost Functions"; Aug. 1996, IEEE Proceedings on Pattern Recognition, ISBN: 1015-4651, pp. 654-658.*

(Continued)

*Primary Examiner*—Bhavesh M. Mehta
*Assistant Examiner*—Manav Seth
(74) *Attorney, Agent, or Firm*—Sughrue Mion, PLLC

(57) ABSTRACT

Method and device for extracting a specified image subject including an extracting condition of an extracting algorithm of a subsequent stage so as to be adapted to an extraction result by the extracting algorithm of a precedent stage, when specified image subject extracting algorithms are successively implemented. At the time of performing the specified image subject extracting algorithms in each stage by parallel processing, the method and device manage extraction states of each step and qualify extraction processing conditions in the subsequent stage in accordance with the extraction states in the precedent stages. The method and device perform a vote in an N-dimensional space of image characteristic quantity for each extraction area by the specified image subject extracting algorithm and then perform weighting of degree of certainty as the specified image subject based on an aggregation value of the vote within a section area for aggregation in the N-dimensional space.

26 Claims, 8 Drawing Sheets

OTHER PUBLICATIONS

Yokoyama et al, "Automatic Detection of Facial Feature Points and Contours", 1996, IEEE Paper ISBN: 0-7803-3253, pp. 335-340.*

Wu et al, "Face Detection and Rotations Estimation using Color Information", 1996, IEEE Paper ISBN: 0-7803-3253, pp. 341-346.*

Nguyen et al, "Segmentation, Grouping and feature Detection for Face Analysis", Nov. 1995, IEEE Proceedings in Computer Vision, ISBN: 0-8186-7190-4, pp. 593-598.*

Rolf P. Wurtz, "Object Recognition Robust Under Transitions, Deformations, and Changes in Background", IEEE Transactions on Pattern Analysis and Machine Inteligence, ISBN: 0162-8828, vol. 19, No. 7, pp. 769-775.*

Hasegawa et al, "Real-time Parallel and Cooperative Recognition of Facial Images for an Interactive Visual Human Interface", Oct. 1994, IEEE Paper ISBN: 1051-4651, vol. 3, pp. 384-387.*

* cited by examiner

METHOD AND DEVICE FOR EXTRACTING SPECIFIED IMAGE SUBJECTS

BACKGROUND OF THE INVENTION

The present invention relates to a method and a device for extracting specified image subjects and, more particularly, to a method and a device for extracting a specified image subject which is capable of maintaining extraction performance of specified image subject, for example, a human face in an ordinary scene and enhancing extraction performance of a specified image subject, for example, a human face in a scene shot with a close-up electronic flash or back-light.

Heretofore, the images recorded on photographic films such as negatives and reversals (which are hereunder referred to simply as "films") have been commonly printed on light-sensitive materials (photographic paper) by means of direct (analog) exposure in which the film image is projected onto the light-sensitive material to achieve its areal exposure.

A new technology has recently been introduced and this is a printer that relies upon digital exposure. Briefly, the image recorded on a film is read photoelectrically, converted to digital signals and subjected to various image processing operations to produce image data for recording purposes; recording light that has been modulated in accordance with the image data is used to scan and expose a light-sensitive material to record a latent image, which is subsequently developed to produce a (finished) print. The printer operating on this principle has been commercialized as a digital photoprinter.

In the digital photoprinter, images can be processed as digital image data to determine the exposing conditions for printing; therefore, the digital photoprinter is capable of performing effective image processing operations such as the correction of washed-out highlights or flat shadows due to the taking of pictures with backlight or an electronic flash, sharpening and the correction of color or density failures and this enables the production of high-quality prints that reproduce images of the quality that has been impossible to achieve by the conventional direct exposure technique. In addition, not only the assembling of images and the splitting of a single image into plural images but also the compositing of characters can be performed by processing the image data and, as a result, prints can be outputted after various editing and/or processing operations have been performed in accordance with specific uses.

Outputting images as prints is not the sole capability of the digital photoprinter; the image data can be supplied into a computer or the like and stored in recording media such as a floppy disk; hence, the image data can be put to various non-photographic uses.

Having these features, the digital photoprinter is basically composed of an image input machine and an image output machine. The image input machine has a scanner (image reading apparatus) that reads the image on a film photoelectrically and an image processing apparatus that processes the captured image to produce output image data (exposing condition). The image output machine has a printer (image recording apparatus) that records a latent image on a light-sensitive material by scan exposing it in accordance with the image data supplied from the image input unit and a processor (developing apparatus) that performs development and other necessary processing on the exposed light-sensitive material to produce a print.

In the scanner, reading light issuing from a light source is allowed to be incident on a film, from which projected light bearing the image recorded on the film is produced and focused by an imaging lens to form a sharp image on an image sensor such as a CCD sensor; the image is then captured by photoelectric conversion and sent to the image processing apparatus as data for the image on the film (as image data signals) after being optionally subjected to various image processing steps.

In the image processing apparatus, image processing conditions are set on the basis of the image data captured with the scanner and image processing as determined by the thus set conditions is performed on the captured image data and the resulting output image data for image recording (i.e., exposing conditions) are sent to the printer.

In the printer, if it is of a type that relies upon exposure by scanning with an optical beam, the latter is modulated in accordance with the image data sent from the image processing apparatus and deflected in a main scanning direction as the light-sensitive material is transported in an auxiliary scanning direction perpendicular to the main scanning direction, whereby a latent image is formed as the result of exposure (printing) of the light-sensitive material with the image bearing optical beam. In the processor, development and other processing as determined by the light-sensitive material are performed to produce a print reproducing the image that was recorded on the film.

If the original image contains a human individual, his or her face is the most important when the original image is reproduced by the photoprinters whether they are digital or of the conventional analog type (the two types are hereinafter collectively referred to as "photoprinters") and the quality and evaluation of the reproduced image, or print, are greatly affected by how beautifully the face of the human individual is finished.

To deal with this problem, the conventional photoprinters extract the face (face region) of a human individual from the image on a film and determines exposing conditions (image processing conditions for producing output image data in the case of a digital photoprinter, and the amount of exposing light and the amounts by which color filters are to be inserted in the case of an analog photoprinter and the like) that enable the face to be finished in the desired way.

Particularly in the case of a digital photoprinter which is capable of very flexible image processing through the processing of image data, the information on the face is important for setting image-dependent optimal image processing conditions and performing the appropriate face extraction is the way that enables high-quality prints to be produced in a more consistent manner.

Under these circumstances, various methods of subject extraction have so far been proposed for extracting various kinds of specified image subjects such as principal image subjects inclusive of the face and the like. To mention a few examples, skin color extraction using the color hues and chromas of an image and contour extraction by detecting the edge portions of an image are known.

However, the state of the images on films varies with the shooting conditions under which the images were taken, such as whether they were shot with an electronic flash or backlight, or whether the films were overexposed or underexposed or whether color failure occurred. Hence, each of these methods of extraction that has been proposed to date cannot ensure consistent and precise face extraction from various states of images.

The precision of face extraction can be improved by combining a plurality of methods of extracting image subjects. However, in order to perform consistent and precise face extraction from various states of images, many methods of extraction have to be combined and the time of performing the necessary processing and calculations to extract the desired image subject will inevitably increase to cause undesired effects such as the decrease in the efficiency of print production.

SUMMARY OF THE INVENTION

The present invention has been accomplished under these circumstances and has a first object of providing a method of extracting specified image subjects which, when used with digital and analog photoprinters alike, can extract the intended specified image subject with high precision and satisfactory efficiency from various states of images.

Second object of the present invention is to provide a device for extracting specified image subject by implementing the above method.

In order to attain the first object described above, the first aspect of the present invention is to provide a method of extracting a specified image subject which successively implements a plurality of specified image subject extracting algorithms, comprising the steps of implementing an extracting algorithm of a precedent stage under a predetermined extracting condition to obtain an extraction result, changing an extracting condition of a subsequent stage so as to be adapted to the thus obtained extraction result, and implementing an extracting algorithm of the subsequent stage under the thus changed extracting condition.

The second aspect of the present invention is to provide a method of extracting a specified image subject which implements a plurality of specified image subject extracting algorithms in each stage of a plurality of stages by means of parallel processing, comprising the steps of managing respective extracting states of the plurality of specified image subject extracting algorithms in each stage, qualifying respective extraction processing conditions of the plurality of specified image subject extracting algorithms in a subsequent stage according to the respective extracting states in a precedent stage, and implementing the plurality of specified image subject extracting algorithms of the subsequent stage under the thus qualified respective extraction processing conditions by means of parallel processing. It should be noted that the parallel processing in this specification further includes substantial parallel processing based on time sharing in addition to the concurrent processing.

Preferably, the respective extraction processing conditions are areas to be subjected to extraction processing when implementing the plurality of specified image subject extracting algorithms of the subsequent stage, types of extracting algorithms to be implemented at the subsequent stage or control parameters inside extracting algorithms to be implemented in the subsequent stage.

Preferably, the plurality of specified image subject extracting algorithms to be implemented by means of parallel processing in each stage are of the same combination or the different combination in the plurality of stages.

On the other hand, the present invention can also be embodies as a device for extracting a specified image subject implementing the above-described method of extracting the specified image subject.

The third aspect of the present invention is to provide a device for extracting a specified image subject, comprising a plurality of stages of image subject extraction processing units for successively performing a plurality of specified image subject extracting algorithms, respectively, and an extracting condition change control unit for adaptively changing an extracting condition in an image subject extraction processing unit of a subsequent stage in accordance with an image subject extraction result by the image subject extraction processing unit of a precedent stage.

The fourth aspect of the present invention is to provide a device for extracting a specified image subject, comprising a plurality of stages of image subject extraction parallel processing units, each image subject extraction parallel processing unit for implementing a plurality of specified image subject extracting algorithms in each stage of the plurality of stages by means of parallel processing, and a control unit for managing respective image subject extraction states of the plurality of specified image subject extracting algorithms in each stage by each image subject extraction parallel processing unit of the image subject extraction parallel processing units and qualifying respective extraction processing conditions of the plurality of specified image subject extracting algorithms in a subsequent stage of an image subject extraction parallel processing unit according to the respective image subject extraction states by the precedent stage of the image extraction parallel processing unit.

Preferably, the control unit qualifies as the respective extraction processing conditions areas to be subjected to extraction processing in the subsequent stage of the image subject extraction parallel processing unit, types of extracting algorithms to be implemented in the subsequent stage of the image subject extraction parallel processing unit or control parameters inside extracting algorithms to be implemented by the subsequent stage of the image subject extraction parallel processing unit.

Preferably, the image subject extraction parallel processing unit implements the plurality of specified image subject extracting algorithms with the same combination or the different combination in each stage of the plurality of stages by means of parallel processing.

In order to attain the first object described above, the fifth aspect of the present invention is to provide a method of extracting a specified image subject, comprising the steps of performing image subject extraction processing by a specified image subject extracting algorithm or algorithms for each extraction area, performing a vote in an N-dimensional space of an image characteristic quantity for each extraction area extracted by the specified image subject extracting algorithm or algorithms, and performing weighting of degree of certainty as a specified image subject based on an aggregation value of the vote within a section area for aggregation in the N-dimensional space.

Preferably, the image subject extraction processing by the specified image subject extracting algorithm or algorithms is performed through dividing it into a plurality of stages and the image subject extraction processing in a subsequent stage is preferentially applied to an extraction area in which the aggregation value in the voting space of the image characteristic quantity exceeds a predetermined value.

Preferably, the specified image subject extraction processing by the specified image subject extracting algorithm or algorithms is performed through dividing it into a plurality of stages, and the image subject extraction processing in a subsequent stage is preferentially applied to an extraction area corresponding to the section area for aggregation within a preferential frame in the voting space of the image characteristic quantity.

Preferably, a combination of a plurality of image characteristic quantities selected from the group consisting of a position, size, direction or orientation of an extraction area and, a posture, density or color tint of an image subject is used as the N-dimensional space of the image characteristic quantity.

Preferably, weighting value lowering processing is applied to a region within a predetermined area on a specific characteristic axis with respect to a neighborhood of the region, in which the aggregation value became large, in the N-dimensional characteristic stage.

Preferably, application of the weighting value lowering processing is processing to remove a remarkably large size or a remarkably small size from extraction data.

On the other hand, the present invention can be embodied as a device for extracting a specified image subject using the method of extracting the specified image subject of the above-described fifth aspect.

The sixth aspect of the present invention is to provide a device for extracting a specified image subject, comprising an image subject extraction processing unit for implementing a specified image subject extracting algorithm or algorithms, and a weighting processing unit for performing a vote in an N-dimensional space of image characteristic quantity for each extraction area extracted by the image subject extraction processing unit and performing weighting of degree of certainty as the specified image subject based on an aggregation value of the vote within a section area for aggregation in the N-dimensional space.

Preferably, the image subject extraction processing unit performs the image subject extraction processing in a plurality of divided stages and applies the image subject extraction processing in a subsequent stage preferentially to an extraction area in which the aggregation value in the voting space of the image characteristic value exceeds a predetermined value.

Preferably, the image subject extraction processing unit performs the image subject extraction processing through dividing it into a plurality of stages, and applies the image subject extraction processing in a subsequent stage preferentially to an extraction area corresponding to the section area for aggregation within a preferential frame in the voting space of the image characteristic quantity.

Preferably, the combination of a plurality of image characteristic quantities selected from the group consisting of a position, size, direction or orientation of an extraction area, and a posture, density or color tint of an image subject is used as the N-dimensional space of the image characteristic quantity.

Preferably, the weighting processing unit applies weighting value lowering processing to a region within a predetermined area on a specific characteristic axis with respect to a neighborhood of the region, in which the aggregation value became large, in the N-dimensional characteristic stage.

Preferably, application of the weighting value lowering processing is processing to remove a remarkably large size or a remarkably small size from extraction data.

DETAILED DESCRIPTION OF THE INVENTION

A method and a device of the present invention for extracting specified image subjects are now described in detail with reference to the preferred embodiments shown in the accompanying drawings.

Figure 1:
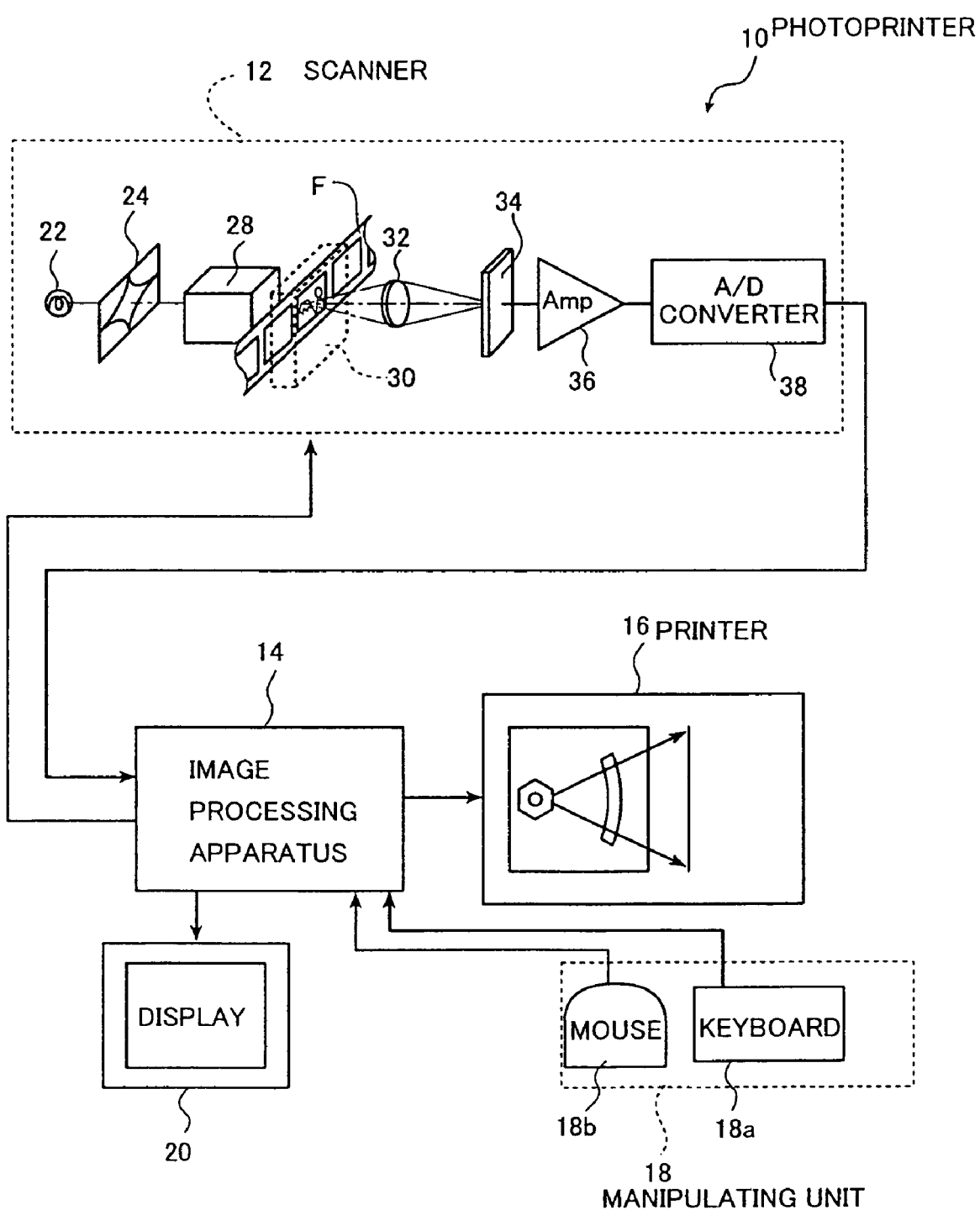
FIG. 1 is a block diagram of a digital photoprinter using an embodiment of a method and a device of the present invention for extracting a specified image subject.

FIG. 1 is a block diagram of a digital photoprinter 10 having a device for extracting a specified image subject (hereinafter referred to simply as ("specified image subject extracting device") therein using a method of extracting a specified image subject (hereinafter referred to simply as "specified image subject extracting method") according to an embodiment of the present invention.

The digital photoprinter (which is hereunder referred to simply as "photoprinter") 10 shown in FIG. 1 comprises basically a scanner (image reading apparatus) 12 for photoelectrically reading the image recorded on a film F, an image processing apparatus 14 which performs image processing on the thus read image data (image information) and with which the photoprinter 10 as a whole is manipulated and controlled, and a printer 16 which performs imagewise exposure of a light-sensitive material (photographic paper) with light beams modulated in accordance with the image data delivered from the image processing apparatus 14 and which performs development and other necessary processing to produce a print.

Connected to the image processing apparatus 14 are a manipulating unit 18 having a keyboard 18a and a mouse 18b for inputting (setting) various conditions, selecting and commanding a specific processing step and entering a command and so forth for effecting color/density correction, as well as a display 20 for representing the image captured with the scanner 12, various manipulative commands and pictures for setting and registering various conditions.

It should be noted that the applicability of the specified image subject extracting device according to the present embodiment of the present invention is not limited to the photoprinter described above; it is also applicable with advantage to the conventional analog photoprinter relying upon direct exposure in which the image recorded on a film is read photoelectrically, exposing conditions such as a quantity of exposing light, for example, a value by which a variable diaphragm should be stopped down, a quantity of color adjustment, for example, amounts by which color filters should be inserted and the like are determined on the basis of the obtained image data, and the light-sensitive material is exposed with a projected light under the thus determined exposing conditions.

The scanner 12 is an apparatus with which the images recorded on the film F are read photoelectrically frame by frame. It comprises a light source 22, a variable diaphragm 24, a diffuser box 28 which diffuses the reading light incident on the film F so that it becomes uniform across the plane of the film F, an imaging lens unit 32, an image sensor 34 having line CCD sensors capable of reading R (red), G (green) and B (blue) images, an amplifier (Amp) 36 and an A/D (analog/digital) converter 38.

In the photoprinter 10, dedicated carriers are available that can be loaded into the housing of the scanner 12 in accordance with the type of the film used (e.g. whether it is a film of the Advanced Photo System or a negative or reversal film of 135 size), the format of the film (e.g., whether it is a strip or a slide) or other factor. By replacing one carrier with another, the photoprinter 10 can be adapted to process various kinds of films in various modes. The images (frames) that are recorded on the film and which are subjected to the necessary procedure for print production are transported to and held in a specified reading position by means of the carriers.

The scanner 12 captures the images recorded on the film F in the following manner; the reading light from the light source 22 has its quantity adjusted by means of the variable diaphragm 24 and is incident on the film F held in the specified reading position by means of the carrier and thereafter passes through the film F to produce projected light bearing the image recorded on it.

Figure 2A:
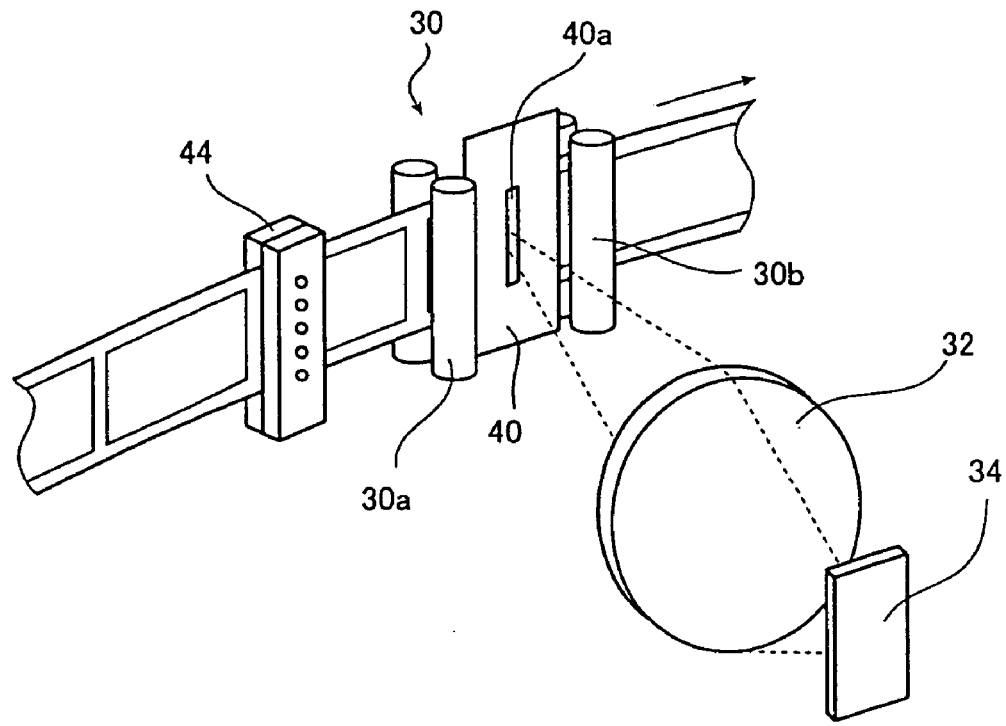
FIG. 2A is a schematic perspective view for illustrating a carrier to be installed in the digital photoprinter shown in FIG. 1.

As shown schematically in FIG. 2A, the above-described carrier 30 has a pair of transport roller pairs 30a and 30b and a mask 40 having a slit 40a. The transport rollers 30a and 30b are provided on opposite sides of the specified reading position in an auxiliary scanning direction which is perpendicular to the main scanning direction (i.e., the direction in which the line CCD sensors in the image sensor 34 extend) and they transport the film F with its length being parallel to the auxiliary scanning direction as it is in registry with the reading position. The slit 40a defines the projected light from the film F to have a specified narrow shape, is in registry with the reading position and extends in the main scanning direction.

Being held in registry with the reading position, the film F is transported in the auxiliary scanning direction by means of the carrier 30 as it is illuminated with the reading light. Consequently, the film F is subjected to two-dimensional slit scan with the reading light passing through the slit 40a extending in the main scanning direction, whereupon the image of each frame recorded on the film F is captured.

Reference numeral 44 in FIG. 2A is a code reader for reading various bar codes such as a DX code, expanded DX code, FNS code and the like that are recorded optically on the film F.

Magnetic recording media are formed on films of the Advanced Photo System. Carriers adaptive to films of the Advanced Photo System (or their cartridges) are equipped with magnetic heads that read the information recorded on the magnetic recording media and which write necessary information to the media. During image capturing from the film F, the magnetic heads read relevant magnetic information and the necessary information is sent from the scanner 12 to the image processing apparatus 14.

As already mentioned, the reading light passes through the film F held on the carrier 30 and the resulting image-bearing, projected light is focused by the imaging lens unit 32 to form a sharp image on the light-receiving plane of the image sensor 34.

Figure 2B:
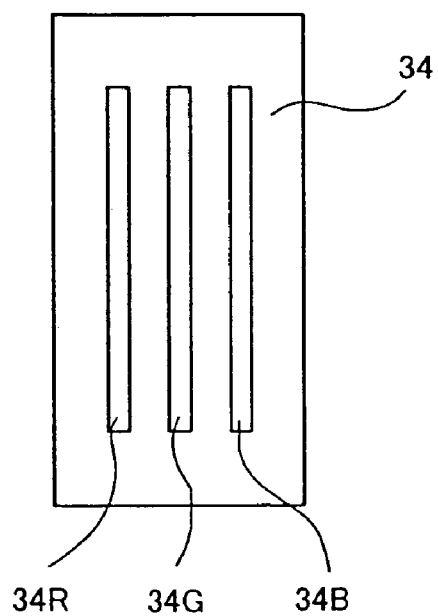
FIG. 2B is a conceptual view of an image sensor in the digital photoprinter shown in FIG. 1.

As shown in FIG. 2B, the image sensor 34 is a 3-line color CCD sensor comprising a line CCD sensor 34R for reading R image, a line CCD sensor 34G for reading G image, and a line CCD sensor 34B for reading B image. As already mentioned, the respective line CCD sensors extend in the main scanning direction. The projected light from the film F is separated into three primary colors R, G and B and captured photoelectrically by means of the image sensor 34.

The output signals from the image sensor 34 are amplified with the amplifier 36, converted to digital form in the A/D converter 38 and then sent to the image processing apparatus 14.

In the scanner 12, the images recorded on the film F are captured by two scans, the first being prescan at low resolution and the second being fine scan for obtaining output image data. Prescan is performed under preset reading conditions that ensure that the images on all films to be handled by the scanner 12 can be read without saturating the image sensor 34. Fine scan uses the prescanned data and is performed under reading conditions that are set for each frame such that the image sensor 34 is saturated at a slightly lower density than the minimum density of the image (frame) of interest.

The output signals for prescan and fine scan are essentially the same data except for resolution and output level.

It should be noted that the scanner to be used in the photoprinter using the specified image subject extracting method and device is by no means limited to a type that relies upon the slit scan capturing described above but that it may be of a type that relies upon areal capturing, or a technique by which the entire surface of the image in one frame is illuminated with the reading light for capturing the image at a time.

In this alternative approach, an area CCD sensor may be used with means of inserting R, G and B color filters being provided between the light source and the film F. Image capturing with the area CCD sensor is performed with R, G and B color filters being sequentially inserted to color separate the image recorded on the film.

As already mentioned, the digital signals outputted from the scanner 12 are fed into the image processing apparatus 14.

Figure 3:
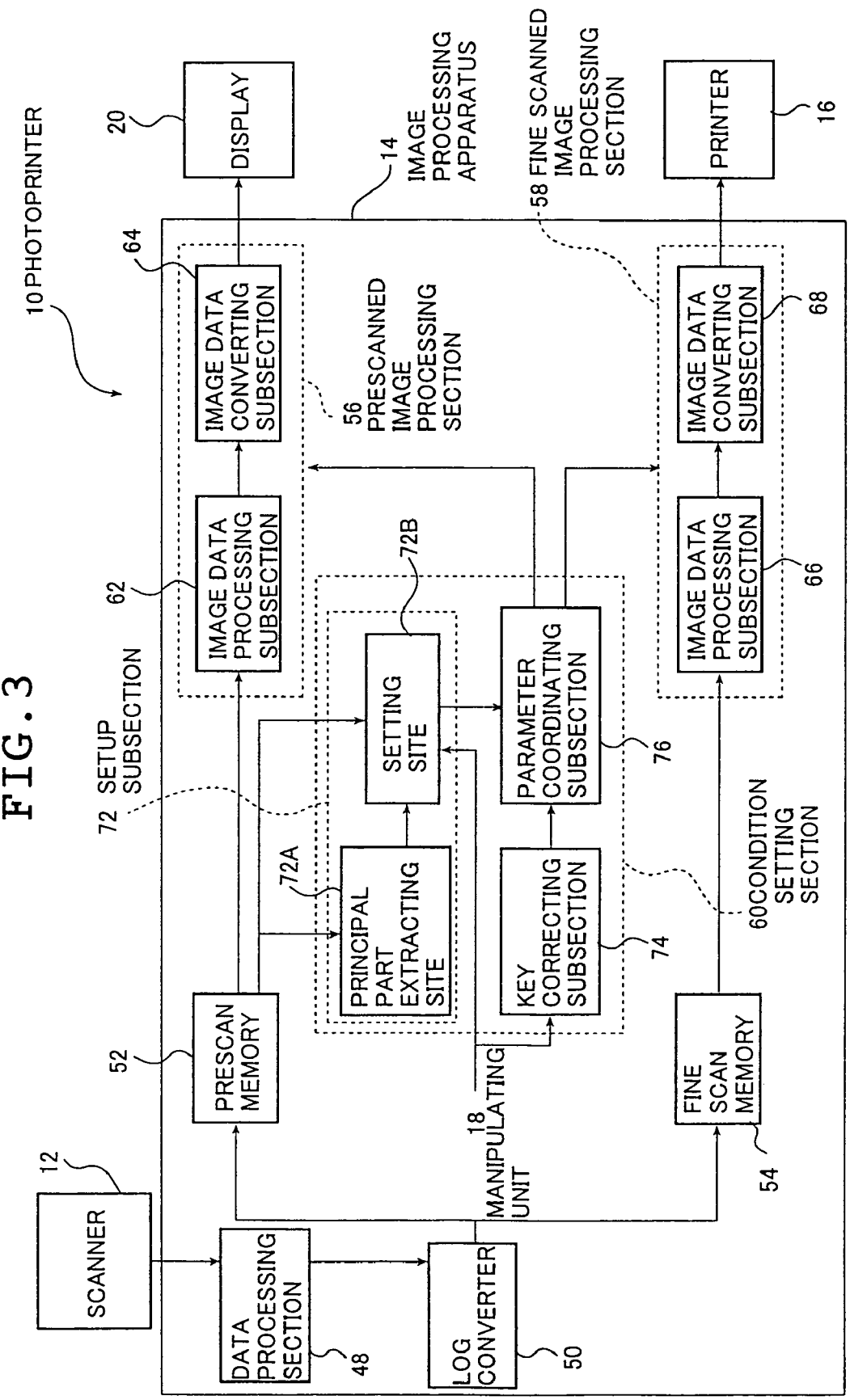
FIG. 3 is a block diagram of an image processing apparatus in the digital photoprinter shown in FIG. 1.

FIG. 3 is a block diagram of the image processing apparatus 14, which comprises a data processing section 48, a log converter 50, a prescan (frame) memory 52, a fine scan (frame) memory 54, a prescanned image processing section 56, a fine scanned image processing section 58, and a condition setting section 60.

FIG. 3 shows only the parts related to image processing and besides these parts, the image processing apparatus 14 includes a CPU for controlling and managing the overall operation of the photoprinter 10 including the image processing apparatus 14, memories for storing the information necessary for the operation and otherwise of the photoprinter 10. The manipulating unit 18 and the display 20 are connected to related parts via the CPU and the like (CPU bus).

The R, G and B digital signals outputted from the scanner 12 are sent to the data processing section 48, where they are subjected to specified data processing steps such as dark correction, defective pixel correction and shaving correction. Thereafter, the processed digital signals are transferred into the log converter 50, where they are converted to digital form (density data), of which prescanned data is stored in the prescan memory 52 and fine scanned data is stored in the fine scan memory 54.

The prescanned data stored in the prescan memory 52 is read into the prescanned image processing section 56 having an image data processing subsection 62 and an image data converting subsection 64 whereas the fine scanned data stored in the fine scan memory 54 is read into the fine scanned image processing section 58 having an image data processing subsection 66 and an image data converting subsection 68.

The image data processing subsection 62 in the prescanned image processing section 56 and the image data processing subsection 66 in the fine scanned image processing section 58 are the sites where the image (image data) captured with the scanner 12 is subjected to specified image processing steps in accordance with the conditions that are set by means of the condition setting section 60 to be described later in this specification. The two image data processing subsections 62 and 66 perform basically the same processing except for resolution.

The image processing steps to be performed by the image data processing subsections 62 and 66 are not limited to any particular types and may be exemplified by various known image processing steps in the art. Examples include gray balance adjustment, tonal correction and density (lightness) adjustment that are performed using LUTs (look-up tables), as well as correction for the kind of light source used in taking the picture and the chroma adjustment (color adjustment) of the image that are performed by matrix (MTX) operations. Other examples are electronic magnification, dodging (compressing/extending the density's dynamic range) and sharpening; these steps are performed using a low-pass filter, an adder, LUTs, MTXs and so forth, or by averaging, interpolation and other means that use appropriate combinations of those devices.

The conditions for the above-mentioned image processing steps are set in the condition setting section 60 (to be described below) using the prescanned data.

The image data converting subsection 68 is a site where the image data processed by the image data processing subsection 66 is converted with a 3D (three-dimensional) LUT or the like into image data that is subsequently supplied into the printer 16 as image data corresponding to image recording with the printer 16.

The image data converting subsection 64 optionally thins out the image data processed by the image data processing subsection 62 and similarly converts the thinned out image data with a 3D-LUT or the like into image data that corresponds to the representation on the display 20 and which is subsequently supplied to the display 20.

The conditions for the processing to be done in the two image data converting subsections 64 and 68 are set in the condition setting section 60 (which is described below) using the prescanned data.

The condition setting section 60 sets the conditions for the various image processing steps to be done in the prescanned image processing section 56 and the fine scanned image processing section 58. It also sets the reading conditions for fine scan. The condition setting section 60 comprises a setup subsection 72, a key correcting subsection 74 and a parameter coordinating subsection 76.

The setup subsection 72 has a principal part extracting site 72A for extracting the principal part, such as the principal image subject, specified image subject or the like of the image using the prescanned data and a setting site 72B which, in response to the information about the specified image subject extracted by the principal part extracting site 72A, the prescanned data and an optionally entered operator's command, sets the reading conditions for fine scan and supplies them to the scanner 12; in addition, the setting site 72B constructs (or calculates) the conditions for the image processing steps to be done in the prescanned image processing section 56 and the fine scanned image processing section 58 and supplies them to the parameter coordinating subsection 76.

The above-described principal part extracting site 72A constitutes the specified image subject extracting device for implementing the specified image subject extracting method according to the present invention.

Figure 4:
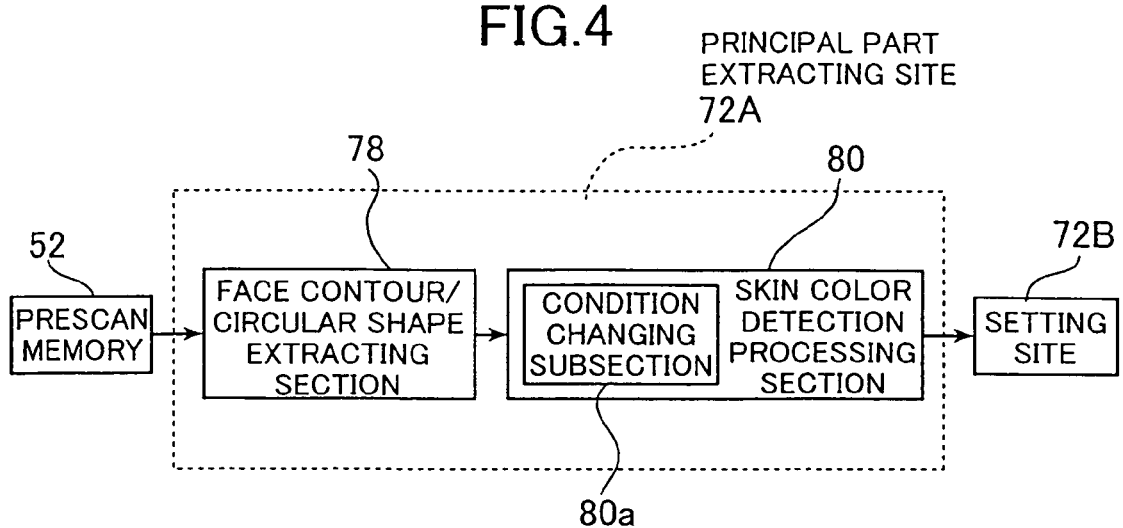
FIG. 4 is a block diagram of an embodiment of a principal part extracting site in the image processing apparatus shown in FIG. 3.

FIG. 4 shows a block diagram of an embodiment of the principal part extracting site 72A which constitutes the specified image subject extracting device of a third aspect of the present invention implementing the specified image subject extracting method of the first aspect of the present invention which extracts a human face as the specified image subject. However, this is not the sole example of the present invention.

In the embodiment of the present aspect, the principal part extracting site 72A comprises a face contour/circular shape extracting section 78 for implementing the face contour extraction as a first extraction processing and a skin color detection processing section 80 for extracting a skin color area which has been effected by broadening the skin color definition region in a color space through changing an extracting condition by a condition changing subsection 80a therein as a second extraction processing based on a result of processing by the face contour/circular shape extracting section 78.

The face contour/circular shape extracting section 78 implements an edge extraction and a circular shape extraction using a face contour/circular shape extracting algorithm thereby extracting a face region as the specified image subject. That is, a human face is ordinarily elliptical so that the face contour/circular shape extracting section 78 extracts an elliptical or circular shape portion that is estimated to represent the human face and designates it as a candidate face region.

With respect to the extraction of the face region by this face contour/circular shape extracting algorithm, for example, a technique disclosed in commonly invented Unexamined Published Japanese Patent Application (kokai) No. 8-184925 can favorably be used.

This technique is to extract only the region corresponding to the human face without being affected by the colors of the regions corresponding to the human face and the neighborhood thereof in the image. Image data is taken in and divided into a plurality of regions by binarization or other techniques; then, a pattern representing a human head contour, a pattern representing the human face contour, a pattern representing an internal structure of the human face and a pattern representing a human body are each detected from a plurality of the thus divided regions; then, candidate face regions are set in accordance with the respective detected patterns; weight coefficients with a positive sign are successively imparted to the thus set respective candidate face regions while weight coefficients with a negative sign are imparted to non-human regions; then, a region which is most probable to be a region corresponding to the face region is extracted from among the candidate face regions and weight coefficients set in above-described respective processing steps.

The skin color detection processing section 80 implements the skin color extraction using the skin color extracting algorithm by changing the extracting condition of the skin color extraction of the subsequent stage by the condition changing subsection 80a so as to be adapted to a result of processing in the face contour/circular shape extracting section 78 in a precedent stage thereby extracting the face region as the specified image subject. Namely, the skin color detection processing section 80 detects a hue and chroma of each pixel from image data by the skin color extracting condition which has been changed in the condition changing subsection 80a thereby extracting a pixel region (skin color region) which can be estimated as the skin color corresponding to the human skin.

Conventionally, as described above, skin color may greatly deviate from the ordinary hue or density thereof depending on the shooting condition under which the image is taken, such as being shot with backlight, an electronic flash or the like; hence, in such a case, detection precision of the skin color region is deteriorated to a great extent.

By contrast, the specified image subject extracting method and device according to the present embodiment has solved the above-described problem by, as a first step, extracting the candidate face region by the face contour/circular shape extracting section 78 and then by, as a second step, judging whether the thus extracted region is the skin color region or not by the skin color detection processing section 80 based on the skin color extracting condition which has been changed by the condition changing subsection 80a so as to be adapted to the result of extraction by the candidate face region.

Main points of operations of the specified image subject extracting method and the specified image subject extracting device implementing the method according to the present embodiment are described in detail below with reference to an operation flowchart shown in FIG. 5.

First, the face contour/circular shape extracting section 78 performs an edge detection by differential filtering and binarization by a specified threshold value on the prescanned image data (the data may optionally be thinned out) and then performs a trace on the basis of the thus detected edge. Figures extracted from lines of the contour are checked with a figure of an preliminarily prepared elliptical shape modeled after a human face and then a figure which has a predetermined degree of resemblance is extracted from among them as a candidate region that has a high probability of being a region corresponding to the human face (step 501).

Next, the skin color detection processing section 80 detects the hue and chroma of each pixel from the image data in the candidate region which has a high probability of being the region corresponding to the human face that have been extracted by the above-described face contour/circular shape extracting section 78 based on the skin color extracting condition which has been changed by the condition changing subsection 80a thereby extracting a pixel region (skin color region) that is estimated to represent a skin color corresponding to the human skin (steps 502–505). In this case, the condition changing subsection 80a preferably alleviate the criteria of the judging condition (skin color extracting condition) on which the judgment is made as to whether the thus detected hue and chroma are within a category of the skin color or not to be less strict than those of the ordinary judging condition of the skin color.

In other words, as described above, since the human skin color greatly varies with the shooting condition under which the image is taken, conventionally, the judging condition is ordinarily set to be strict so as to avoid a chance that the other region than the human face region is judged as the human face region. In the present invention, since the region to be judged has a high probability of being a candidate region corresponding to the human face region, the judging condition of skin color is set less strict than the ordinary condition by the condition changing subsection 80a, assuming that the skin color judgment here means rather a skin color confirmation thereby intending surely to detect (save) the human individual in the image shot with an electronic flash or backlight which is not judged as the human face under the ordinary judging condition.

Therefore, in this case, with respect to the candidate region with a high probability of being a region corresponding to the human face region which has been extracted in the face contour/circular shape extracting section 78 a precedent stage, for example, a skin color judgment condition which becomes an extracting condition of skin color algorithm in the condition changing subsection 80a of the skin color detection processing section 80 is set less strict by means of broadening the skin color definition region or moving it into the region close to gray.

As a result, an effect can be obtained such that the human individual in the image shot with an electronic flash or backlight which has not been judged as the human face under the conventional judging condition can surely be detected.

The skin color judging condition may be controlled in a successive manner such that the degree of alleviating the skin color judging condition becomes larger as the degree of certainty being the human face in the result of the extraction in the above-described first step (stage) becomes larger. When the degree of certainty of the human face in the result of extraction in the above-described first step is large as well as density of the extracted area (in a positive image) is larger than that of a first predetermined value, the condition of the skin color judgment may be set less strict assuming that the possibility of shooting a scene with backlight is large. Moreover, when the degree of certainty of the human face in the result of extraction in the above-described step 501 is large as well as density of the extracted area (in a positive mage) is smaller than a second specified value, the judging condition of the skin color may be set less strict assuming that the possibility of shooting the scene with en electronic flash is large.

Figure 5:
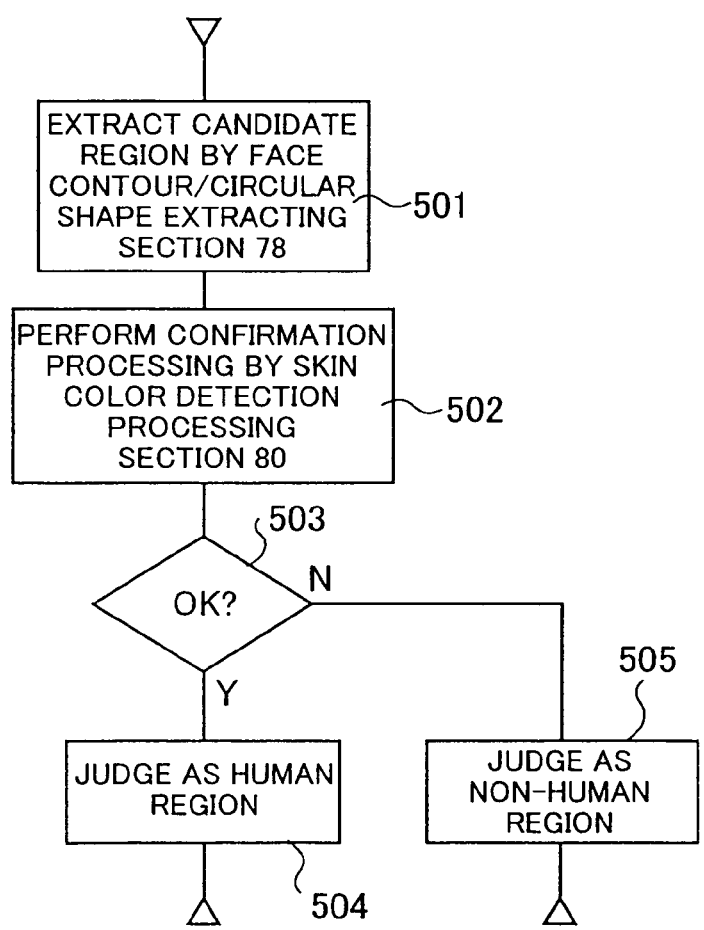
FIG. 5 is an operation flowchart illustrating main points of operations of a device for extracting a specified image subject according to an embodiment of the present invention constituting the principal part extracting site shown in FIG. 4.

With respect to a method of determining the certainty in the above-described extraction result, for example, a method which is shown in FIG. 5 in commonly invented Unexamined Published Japanese Patent Application (kokai) No. 9-138471, that is, a method in which the certainty becomes larger as the number of constituents in detection direction becomes larger or a method in which the certainty becomes larger as an aspect ratio is closer to the specified value can advantageously be used.

Moreover, it may be permissible that the certainty becomes larger as a degree of overlapping of an extracted area with another extracted area is larger.

Next, the specified image subject extracting device according to another embodiment of the third aspect of the present invention, the operation thereof and the specified image subject extracting method of the first aspect are described in detail with reference to a block diagram shown in FIG. 6 and a operation flowchart shown in FIG. 7.

Figure 6:
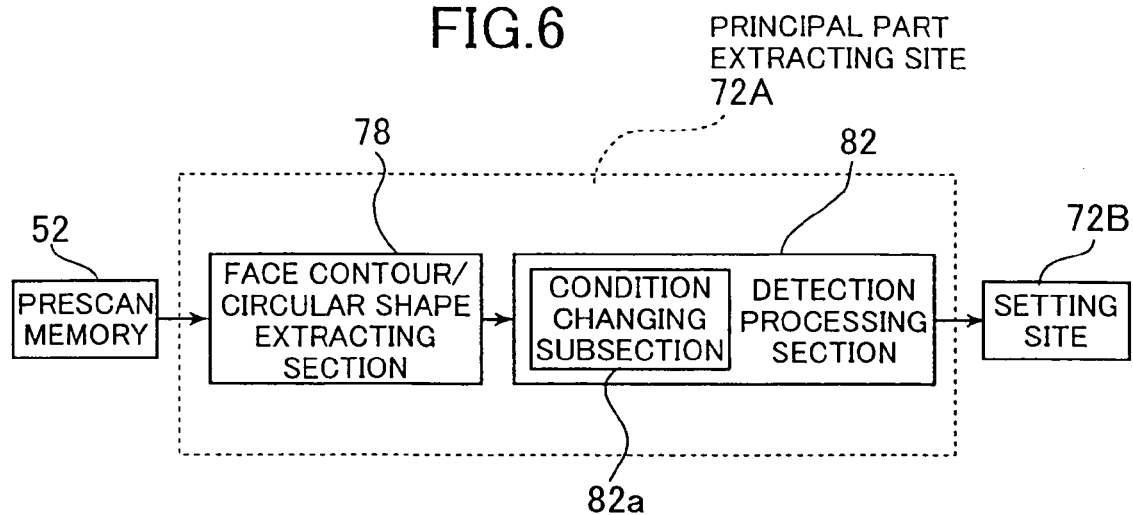
FIG. 6 is a block diagram of another embodiment of the principal part extracting site in the image processing apparatus shown in FIG. 3.

In the specified image subject extracting device of an embodiment shown in FIG. 6, the principal part extracting site 72A is constituted by a detection processing section 82 of face composing elements such as an eye, a nose, a mouth and the like instead of the skin color detection processing section 80 of the embodiment shown in FIG. 4.

Figure 7:
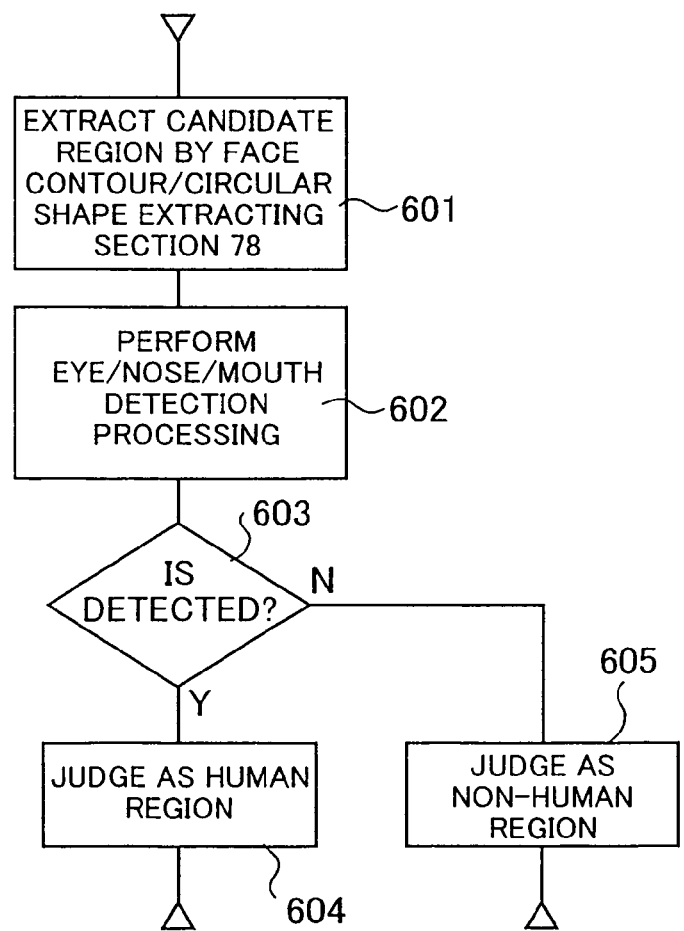
FIG. 7 is an operation flowchart illustrating main points of operations of a device for extracting a specified image subject according to another embodiment of the present invention constituting the principal part extracting site shown in FIG. 6.

As shown in the operation flowchart in FIG. 7, in the specified image subject extracting method and device according to the present embodiment, after, as a first step (stage), the candidate face region is similarly extracted by the face contour/circular shape extracting section 78, as a second step, with respect to the above-described candidate face region, the detection processing section 82 judges whether the face composing element such as the eye, nose, mouth or the like is present in the candidate face region under the face composing element extracting condition which has been changed by the condition changing subsection 82a so as to be adapted to the result of extraction in the first step (stage).

In this case, in the detection processing of the face composing element such as the eye, nose, mouth or the like in the second step (stage) in the detection processing section 82, a threshold value for detecting an edge is set in a lower side by the condition changing subsection 82a whereby an effect which, with respect to the human individual in the image shot with an electronic flash or backlight which has a possibility of being neglected due to the fact that the face composing element such as the eye, nose, mouth or the like is not judged as such by the ordinary judgment, enables to detect in a sure manner the human individual in the image shot with an electronic flash or backlight through detecting in a sure manner the face composing element such as the eye, nose, mouth or the like can be obtained.

The combination of the step 1 and the step 2 described above is not limited to the embodiment described above, but it is a gist, as described above, that, when extracting algorithms of N (N≧2) types of specified image subjects are successively implemented in corresponding N types of specified image subject extraction processing section, the extracting condition of the extracting algorithm in a subsequent step (stage) is changed so as to be adapted to the result of extraction by the extracting algorithm in a precedent step (stage).

Another embodiment of the present invention will now be further described in detail.

The specified image subject extracting method and device according to the present invention divide the image region by a contour with a specified shape and then moves into the following step of the extraction processing; in the present embodiment, after, as a first step, an areal division has been implemented based on the result of extraction processing of the contour with a specified shape, as a second step, clustering is implemented within the above-described area by means of color and density to implement a further region division. Thereafter, an image characteristic quantity of each of the thus divided areas is determined and, then, the specified image subject is judged based on the thus determined image characteristic quantity.

According to the above-described embodiment, an effect that, by roughly clipping a significant area in the first step, precision with which the judgment (extraction) processing is implemented after the second step is substantially enhanced can be obtained.

In this case, as a first step, an example that extraction processing of the contour with the specified shape is implemented using the face contour extracting algorithm is shown, but circular shape extraction processing such as morphology processing or the like may be used.

Next, an embodiment of the specified image subject extracting method of the second aspect of the present invention and the specified image subject extracting device of a fourth aspect of the present invention will now be described.

Figure 8:
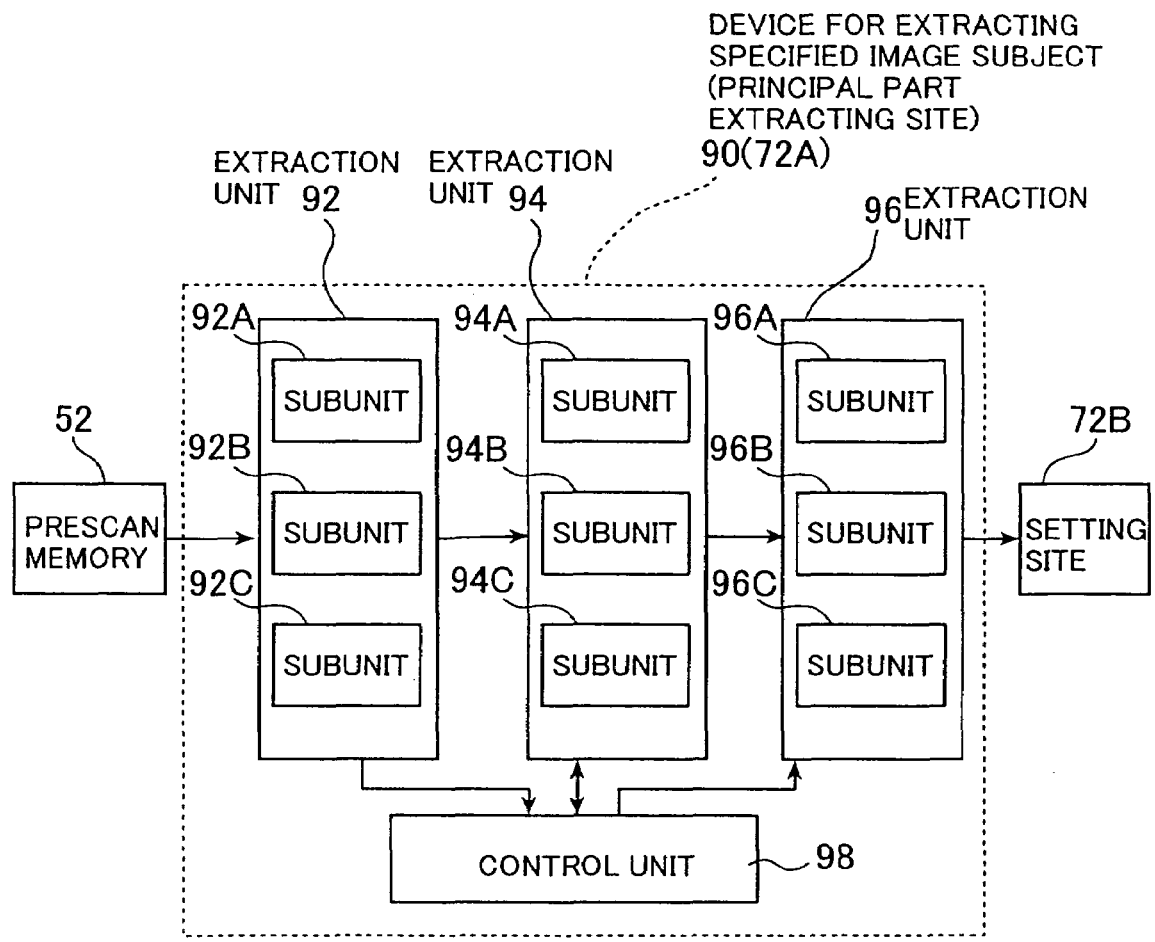
FIG. 8 is a block diagram of another embodiment of a device for extracting a specified image subject according to the present invention.

FIG. 8 conceptually shows a block diagram of a specified image subject extracting device according to the present embodiment.

The specified image subject extracting device 90 shown in FIG. 8 has an extraction parallel processing unit (hereinafter referred to simply as "extraction unit") 92 including extraction subunits (hereinafter referred to simply as "subunit") 92A, 92B and 92C, an extraction unit 94 including subunits 94A, 94B and 94C and an extraction unit 96 including subunits 96A, 96B and 96C, each of which implements three specified image subject extracting algorithms to be implemented by means of parallel processing and a control unit for qualifying extraction processing conditions (hereinafter referred to simply as "control unit") 98 which manages extraction states of the extraction units 92, 94 and 96 that are cascaded and qualifies the extraction processing conditions of the extraction units 94 and 96 in subsequent stages, for example, the areas to be subjected to the specified image subject extraction processing, the types of the specified image subject extracting algorithms to be used, control parameters inside the specified image subject extracting algorithms to be used and the like in accordance with extraction states of corresponding extraction units 92 and 94 in precedent stages.

In the specified image subject extracting device shown in FIG. 8, a plurality of the specified image subject extracting algorithms are each implemented in a plurality of subunits of one extracting unit, for example, subunits 92A, 92B and 92C of the extracting unit 92 (same is said with the extracting units 94 and 96) by means of parallel processing (inclusive of substantial parallel processing based on time sharing) whereupon the control unit 98 controls each of a plurality of the specified image subject extracting algorithms to be processed by means of parallel processing in each of a plurality of, say, three, extracting units 92, 94 and 96 by dividing such algorithms into a plurality of stages (steps) on a basis of a plurality of extracting units. Then, the control unit checks compliance among the specified image subject extracting algorithms of a plurality (three) subunits at the point (stage) of time when steps of the predetermined extracting units finished with respect to the specified image subject extracting algorithm of each extracting subunit for each of extracting units 92, 94 and 96.

As the specified image subject extracting algorithms to be implemented by means of parallel processing in the above-described plurality of subunits, each processing (which is also called as subunit processing) of skin color extraction, face contour extraction, hair-on-head extraction, eye/nose/mouth/eyebrow extraction, body extraction, non-background area extraction and the like are favorably exemplified. Moreover, when extraction processing in the above-described specified image subject extracting algorithms are divided into extraction units of a plurality of stages, for example, a method of dividing parameters of such as image resolution, a threshold value of edge detection, threshold value of binarization processing or the like into stages is favorably illustrated.

Specifically, when results of extraction by a plurality of subunits in a given region at a stage (step) of a given extraction unit were overlapped (it may be the case in which the degree of the overlap exceeds a predetermined value) as a result of performing the extraction processing on a whole picture by each of the above-described subunits using a given subunit processing, a subunit processing which is to extract undetected, related information is performed at the stage (step) of the next extraction unit by limiting an area of the specified image subject to be processed to the neighborhood of the region in which the results of extraction by the above-described plurality of subunits were overlapped by means of the control unit 98.

Figure 9A:
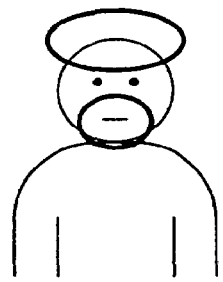
FIGS. 9A and 9B are schematic representations each illustrating an operation of a device for extracting a specified image subject according to another embodiment.
Figure 9B:
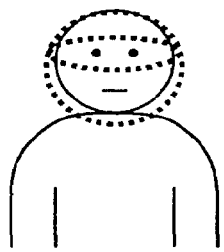

For example, as shown in FIG. 9A, if the hair-on-head and mouth portions are detected (results of extraction by different subunits) at a Nth step (N+1th stage of extraction unit), since these portions are parts of human composing elements, at a subsequent N+1th step (of extraction unit), subunit processing to be performed by the subunit is qualified by the control unit 98 and then the specified image subject extracting algorithms for detecting a contour of the whole face or an eye portion (see FIG. 9B) which is yet to be detected is implemented.

According to the present embodiment, since the extraction subunit processing to be applied in a same frame is controlled such that it is reflected with the precedent extraction result of extraction in the precedent stage, there exists an advantage that the extraction processing is efficiently performed.

Moreover, the type of subunit processing to be performed in each of the above-described subunits or a method of dividing subunit processing into stages of each extraction unit is not limited to embodiments described above.

As the construction of subunit processing (specified image subject extracting algorithms) to be performed in a plurality of subunits of an extraction unit of each stage in extraction units of a plurality of stages, extraction units may be of the same combination or of the different combination. The number of subunit processing to be combined in each extraction unit, namely, the number of subunits, may be the same, different, or one.

For example, in the specified image subject extracting device 90 shown in FIG. 8, subunits 92A, 94A and 96A may be combined such that they performs the same subunit processing; same is said with each of other combinations of 92B, 94B and 96B, and 92C, 94C and 96C. Namely, each of the extraction units 92, 94 and 96 may have the same algorithm construction but have different degrees of resolution, namely, low, medium and high resolution. In this case, subunit processing of subunits 92A, 92B and 92C may be the same with or different from each other. In the case of the same processing, processing conditions such as extracting conditions or the like may preferably be changed, for example, targets to be processed or processing intensities may be changed from each other.

On the other hand, in each of the extraction units 92, 94 and 96, the construction of subunit processing of subunits 92A, 92B and 92C and the construction of subunit processing of subunits 96A, 96B and 96C may be arranged such that these two constructions are different from each other. For example, in the subunits 92A, 92B and 92C of the extraction unit 92 of the first stage, back-ground extracting algorithms of three types out of 1–N types may be combined; in the subunits 94A, 94B and 94C of the extraction unit 94 of the second stage, three types of extracting algorithms out of the face contour extraction, the skin color extraction, the circular extraction by means of a morphology function may be combined; in subunits 96A, 96B and 96C of extraction unit 96 of the third stage, three types of extracting algorithms out of face composing element extraction, such as, the hair-on-head extraction, the body extraction, the eye extraction, the nose/mouth/eyebrow extraction and the like may be combined.

Further, in the control unit 98, as a method of checking compliance among outputs of a plurality of subunits, a method which designates the time when degree of overlap between candidate areas comes to that described above, or when composing elements are extracted up to a specified ratio as a timing of checking can be used.

Then, extraction processing of the remaining composing elements which have not been performed or detected is controlled so as to be applied; in this case, the extraction processing may be applied by limiting a set parameter inside the subunit processing.

As an example of limiting the set parameter inside the subunit processing, a method of limiting the parameter of the degree of resolution of the image as described above, the threshold value of edge extraction, the threshold value of binarization processing or the like from the largeness of an area to be targeted, a distribution of image data is exemplified.

If a result of extraction processing in which such conditions have been limited in some way or other comes out favorably (for example, if an additional composing element is extracted), the candidate area is judged as the image subject to be targeted.

While, if the result thereof does not come out favorably, reverting to the extraction unit of an intermediate stage at which compliance was checked, processing of each subunit is started again. Operations that follow repeat the operations previously described.

According to the above-described embodiment, an extraction sequence is not fixed, but can be controlled in a favorable direction in accordance with development of processing whereupon the targeted subject (the image) can efficiently be extracted.

The criteria of judgment may be adjusted by the principal part extracting site 72A in accordance with the result of image (data) analysis or the operator may enter a suitable command at the operator's own discretion. Further, in the case of a film of the Advanced Photo System, it is possible to detect a scene shot with an electronic flash from magnetic information thereon thereby performing a control.

As mentioned in connection with the prior art, the precision of face extraction can be improved by combining many methods of extracting image subjects but this involves prolonged calculation and image processing times, thereby lowering the efficiency of face extraction.

By contrast, the specified image subject extracting method according to the present invention performs reasonably precise and yet highly efficient extraction of the specified image subject from ordinary images. Only in the case where reasonable precision cannot be assured depending on the state of the image or the like, other image subject extractions are additionally employed to extract the specified image subject in a higher precision.

Hence, according to the present invention, the specified image subject can be extracted in high efficiency and yet with reasonably high precision. In particular, the face extraction that employs the above-described skin color extraction or the face contour/circular shape extraction requires only low resolution or comparatively simple image analysis and yet comparatively high precision is ensured. Given ordinary images, the combination of the two extraction methods described above is favorably sufficient to accomplish reasonably precise face extraction.

Other various known methods of extracting image subjects may be employed in the present invention and several examples are described in the following patents: Unexamined Published Japanese Patent Application (kokai) Nos. 346332/1992, 346333/1992, 346334/1992, 100328/1993, 158164/1993, 165119/1993, 165120/1993, 67320/1994, 160992/1994, 160993/1994, 160994/1994, 160995/1994, 122944/1996, 80652/1997, 101579/1997, 138470/1997 and 138471/1997.

Figure 10:
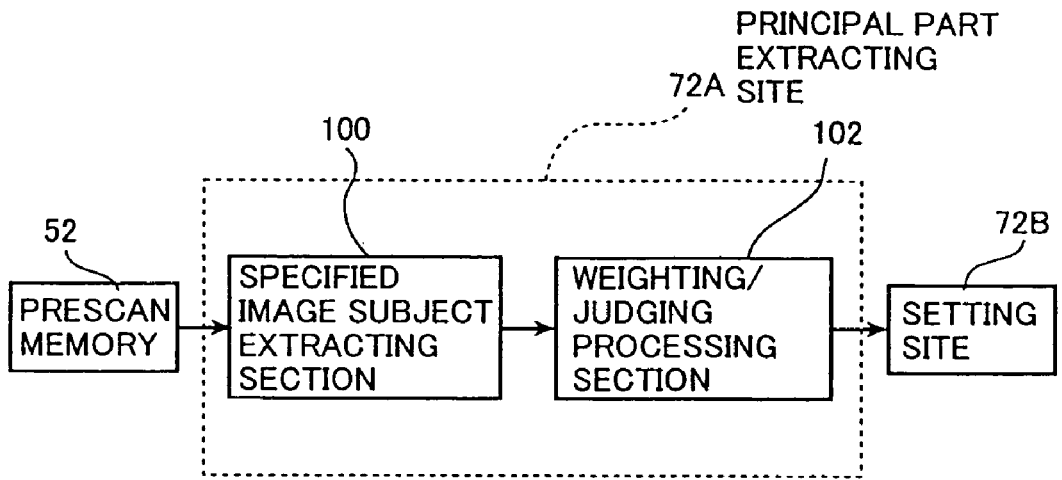
FIG. 10 is a block diagram of another embodiment of the principal part extracting site of the image processing apparatus shown in FIG. 3.
Figure 11:
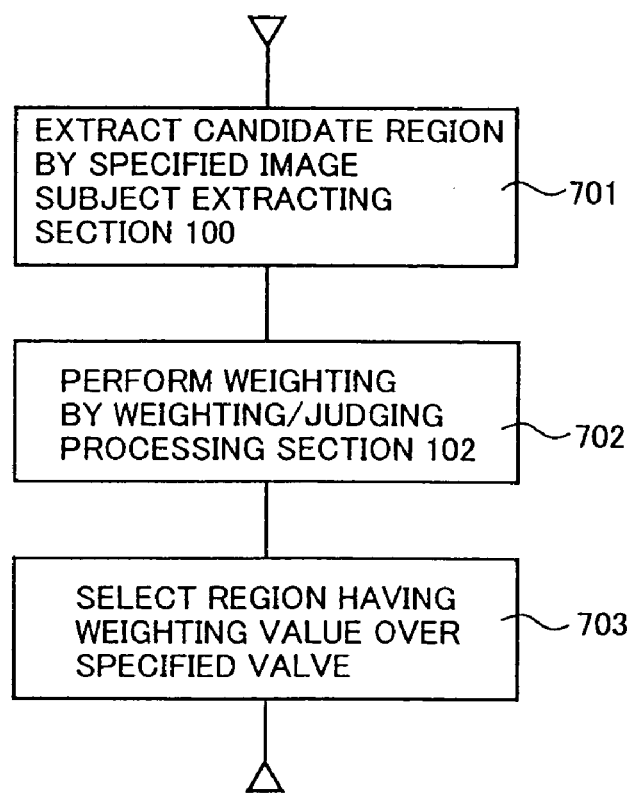
FIG. 11 is an operation flowchart illustrating the main points of the operation of the specified image subject extracting device pertaining to another embodiment of the present invention constituting the principal part extracting site shown in FIG. 4.

FIG. 10 shows a block diagram of an embodiment of the principal part extracting site 72A constituting the specified image subject extracting device of a sixth aspect of the present invention which performs the specified image subject extracting method of the fifth aspect of the present invention; FIG. 11 shows a flowchart of the operation thereof. However, the present invention is by no means limited to the above-described embodiment or operation.

In the embodiment of the present aspect, the principal part extracting site 72A comprises a specified image subject extracting section 100 which performs extraction of the specified image subject as extraction processing and a weighting/judging processing section 102 which performs weighting on an image to be processed in accordance with the degree of concentration in an N dimensional space as a post-treatment based on the result obtained by the processing in this specified image subject extracting section 100.

The specified image subject extracting section 100 extracts a human face region as the specified image subject (principal part) either by using optional plural types of extracting algorithms or by performing a multi-stage parameter setting in a same extracting algorithm. In this case, considering that the human face is ordinarily elliptical, the specified image subject extracting section 100 extract an elliptical or circular shape that is estimated to represent the human face by a plurality of extraction methods described above and designates it as a candidate face region.

When the above-described specified image subject extracting section 100 performs a plurality of extracting methods using different extracting algorithms, various types of the known image subject extracting methods as described above can be utilized.

When a plurality of extraction methods by the above-described specified image subject extracting section 100 is performed by the multi-stage parameter setting in the same extracting algorithm, a position, a size, a direction (orientation in a picture), density/tint, posture (front/side) and the like of the specified image subject in the image are divided into a multiple of stages to set parameters within algorithms. Alternatively, an image resolution, a binarization threshold value, a threshold value for detecting the edge and the like are divided into a multiple of stages to implement algorithms.

Weighting/judging processing section 102 has an object to decide a candidate specified image subject region having a maximum probability from a plurality of candidate specified image subject regions corresponding to a plurality of extracting conditions extracted by the specified image subject extracting section 100. Namely, the weighting/judging processing section 102 performs weighting by the method described below on a plurality of candidate specified image subject regions extracted by the specified image subject extracting section 100 to judge a region which has a high probability as the specified image subject.

Figure 12:
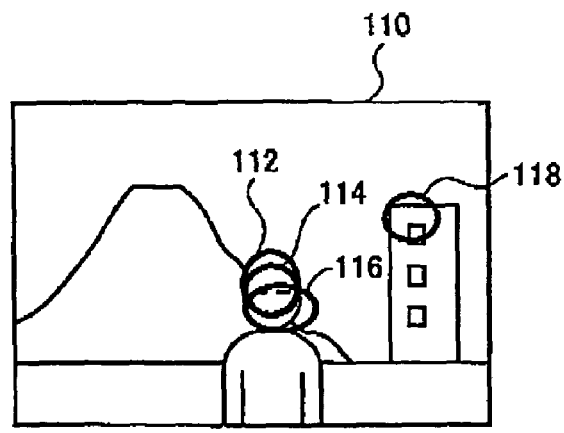
FIG. 12 is a schematic representation showing an embodiment of a result of a specified image subject extracted from an image in the embodiment shown in FIG. 10.

FIG. 12 shows an example of a result that the specified image subject was extracted from an image 110. In this case, the size of the circular shape has been changed into those in four stages using the algorithms for extracting the circular shapes. In FIG. 12, reference numerals 112, 114, 116 and 118 show the result that the circular shapes with the sizes (diameters) of d1~d2, d2~d3, d3~d4 and d4~d5 were aimed to be extracted, respectively. Three points with the numerals 112, 114 and 116 are shown to be concentrated in one place.

This shows that the human face which is the specified image subject in the image to be processed complies with three out of four stages of parameters (in this case, diameter of circle).

Figure 13:
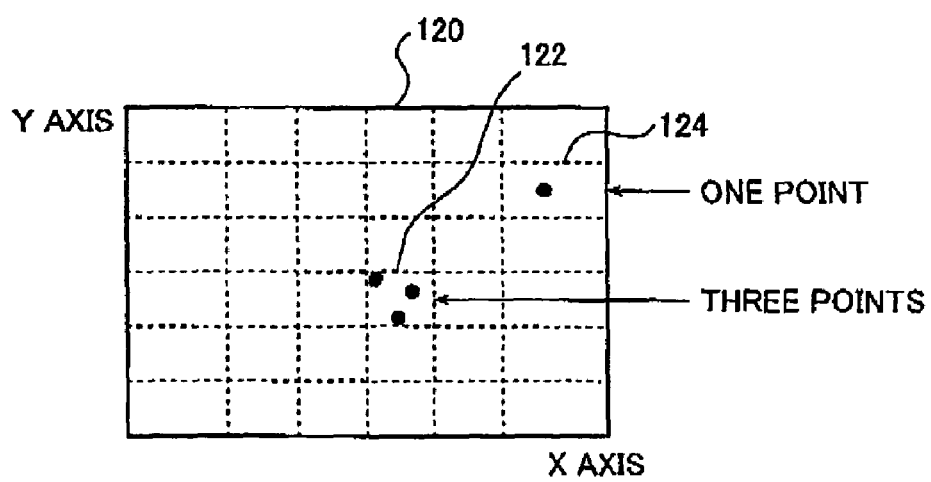
FIG. 13 is a chart illustrating an embodiment of weighting of the result of the specified image subject extracted from the image shown in FIG. 12.

Being based on this result, the weighting/judging processing section 102 plots the position of the center of gravity of each candidate region which has been extracted in a figure for aggregation finely divided as shown in FIG. 13. In FIG. 13, a two-dimensional characteristic quantity space 120 with both axes which are positioned within the image is shown as an example; however, it should be noted that the characteristic quantity space may of course be a three or more-dimensional one.

In the example shown in FIG. 13, three points and one point are plotted in a section 122 and a section 124, respectively. The weighting/judging processing section 102 aggregates the numbers of points plotted in each section to determine a region with a highest probability of being the specified image subject. In this example, the section 122 is determined as the region of the specified image subject.

The device of the present embodiment for extracting the specified image subject, as a first step (stage), extracts the candidate face region by the specified image subject extracting section 100 and then, as a second step (stage), weighting is performed on each of the thus extracted candidate face regions by the weighting/judging processing section based on a plurality of extracting methods.

The method of the present embodiment for extracting the specified image subject and the main point of operations of the specified image subject extracting device will now be described in detail with reference to an operation flowchart shown in FIG. 11.

First, in a step 701, the specified image subject extracting section 100 performs edge detection by differential filtering and binarization by a predetermined threshold value on the prescanned image data (which may optionally be thinned out) and then performs a trace based on the thus detected edge. In this case, a plurality of extraction methods are applied in a similar way to the case described above such that a plurality of extracting algorithms are used or extraction parameters are set in a multiple of stages and the like.

The figure (portion) extracted from lines of contour obtained in the above processing is designated as a candidate region which has a high probability of being the region corresponding to the human face for each extracting condition.

Secondly, in a step 702, the weighting/judging processing section 102 disposes (referred to as "vote") a center of gravity of each figure obtained above in a section in the two-dimensional space and then adds a large weighting value to a candidate region corresponding to a section to which many votes were cast as a poll.

Further, in a step 703, the weighting/judging processing section 102 assumes the candidate region in which the above-described weighting value exceeds the threshold value as a region having a high probability of being the specified image subject thereby judging the candidate region as the specified image subject.

Consequently, there is an advantage that the specified image subject can be established based on the significant weighting value.

The whole processing described above may be assumed as pretreatment for preferentially applying judging processing of the next stage to the candidate region in which the above-described weighting value became large.

In this case, there is an advantage that a conventional wasteful operation in the specified image subject extraction processing can be avoided whereby an efficient processing can be performed.

Moreover, it is an effective way that extraction processing in the specified image subject extracting section 100 is divided into a plurality of steps (stages), the above-described aggregation is determined for each step (stage), limits the points to those in which the thus determined aggregation value (degree of concentration) exceeds the specified value or limits the points to those within a given preferential frame and moves to the judging processing of the next step (stage).

In a case in which the result of the extraction processing does not appear in a preferable direction, namely, if decrease of detection errors is intended, then the method described below is effective.

Namely, there exists a method which performs weighting value decreasing processing (weighting value reduction processing) on a region in a predetermined range on a specific characteristic quantity axis with respect to the neighborhood of the region in which the aggregation value (degree of concentration) becomes large in the above-described N-dimensional characteristic quantity space.

Specifically, there is a method which eliminates an extraction pattern that does not match physically with other patterns by removing a remarkably large size or small size from extraction data or the like. It is also preferable to treat, for example, an overlap or excessive approach of face regions, a mixture of remarkably large and small sizes, extraction data of different orientations or the like as extraction patterns which do not match physically with other patterns.

According to the above-described embodiment, extraction of the specified image subject can be performed ensuring a sufficient precision and good efficiency.

Moreover, partition of a voting space is not necessary to be fixed whereupon a method of performing aggregation while the frame of a predetermined size is moved is permissible. In the case in which the aggregation is performed while the frame of the predetermined size is moved as described above, it becomes possible to prevent a problem, which is effected when aggregation is performed while the frame of the predetermined size is moved, that a concentration point which is inherently one point and is present in the neighborhood of a dividing value is split by the dividing value.

The specified image subject extracting method and device according to each embodiment of the present invention are basically constructed as described above.

Reverting to FIG. 3, a further description thereon will be provided below.

Information of specified image subject (or the region thereof) of the image extracted by the principal part extracting site 72A is provided to the setting site 72B of the setup subsection. The setting site 72B reads the prescanned data from the prescan memory 52, and on the basis of the acquired prescanned data, constructs density histograms and calculates image characteristic quantities such as average density, highlights (minimum density) and shadows (maximum density) to determine the reading conditions for fine scan; in addition to the density histograms and the image characteristic quantities, the setting site 72B is based on the specified image subject of the image extracted by the principal part extracting site 72A and responds to an optionally entered operator command or the like, thereby constructing LUTs for performing gray balance adjustment, tonal correction and density adjustment, constructing MTX operational formulae for performing chroma correction, calculating coefficients for sharpness correction and the otherwise setting conditions for the various image processing schemes and steps to be implemented in the prescanned image processing section 56 and the fine scanned image processing section 58.

The key correcting subsection 74 calculates the amounts of adjustment of image processing conditions typically in accordance with various commands entered by means of keys for adjusting the density (brightness), color, contrast, sharpness, chroma and so forth that have been set in the keyboard 18a or by the mouse 18b; the key correcting subsection 74 then supplies the calculated amounts of adjustment into the parameter coordinating subsection 76.

After receiving the image processing conditions that have been set by the setting site 72B, the parameter coordinating subsection 76 sets them in the prescanned image processing section 56 and the fine scanned image processing section 58. Further, in accordance with the amounts of adjustment calculated by the key correcting subsection 74, the parameter coordinating subsection 76 either corrects (adjusts) the image processing conditions set in various parts or makes another setting of image processing conditions.

We now describe the operations of the scanner 12 and the image processing apparatus 14.

At the request of the preparation of prints of the film F, the operator loads the scanner 12 with a carrier 30 that is associated with the film F, sets the film F (or its cartridge to be more exact) in a specified position on the carrier 30, enters the necessary information such as the size of the prints to be prepared, and thereafter keys in a command for starting print preparation.

In response to the START command, the stop-down value of the variable diaphragm 24 in the scanner 12 and the storage time of the image sensor (line CCD sensors) 34 are set in accordance with the reading conditions for prescan; thereafter, the carrier 30 unwinds the film F from the cartridge and transports it in the auxiliary scanning direction at a specified speed to start prescan; as already mentioned, the film F is subjected to slit scan in registry with the specified reading position and the projected light is focused on the image sensor 34 so that the image recorded on the film F is captured photoelectrically as R, G and B separations.

During the transport of the film F, the magnetic information recorded in the magnetic recording media are read and bar codes such as DX code are read with the code reader 44, whereupon the necessary information is sent to a specified site.

In the present invention, both prescan and fine scan may be performed frame by frame. Alternatively, all frames may successively be subjected to prescan and fine scan. If desired, prescan and fine scan may continuously be performed on frame groups each consisting of a given number of frames. On the pages that follow, the case of reading the image in one frame is described for the sake of simplicity.

The output signals produced from the image sensor 34 by prescan are amplified by the amplifier 36 and sent to the A/D converter 38, where they are converted to digital form. The resultant digital signals are sent to the image processing apparatus 14, where they are given specified data processing steps in the data processing section 48 and converted to prescanned data (digital image data) in the log converter 50, with the prescanned data being then stored in the prescan memory 52.

When the prescanned data is stored in the prescan memory 52, the setup subsection 72 in the condition setting section 60 reads the stored prescanned data out of the prescan memory 52 and supplies it to the principal part extracting site 72A and the setting site 72B.

For example, with respect to the first and third aspects, in the principal part extracting site 72A shown in FIG. 4, as described above, candidate face regions are extracted by the specified image subject extracting processing section such as the face contour/circular shape extracting section 78 or the like; the thus extracted candidate face regions are judged whether these regions are face composing elements such as an eye, a nose, a mouth or the like in the extracting condition change controlling section such as the skin color detection processing section 80, a detection processing section 82 of face composing elements; if the region is judged as the skin color region or the face composing elements, information on the above-described extracted region is sent to the setting site 72B.

With respect to the second and fourth aspects, in the specified image subject extracting device 90 shown in FIG. 8 constructing the principal part extracting site 72A, as described above, a plurality of subunit processing such as skin color extraction, face contour extraction, hair-on-head extraction, eye/nose/mouth/eyebrow (face composing element/elements) extraction or the like are performed by means of parallel processing by a plurality of extraction subunits; extraction parallel processing subunits which perform these parallel processing are cascaded; the thus cascaded subunits performs processing in a plurality of stages and a multiplicity of processing efficiently; when the specified image subject is extracted, the information on this specified image subject is sent to the setting site 72B.

With reference to the fifth and sixth aspects, first, in the principal part extracting site 72A shown in FIG. 10, as described above, the candidate face region (figure) is extracted by the specified image subject extracting section 100; next, the center of gravity of the thus extracted candidate face region (figure) is voted to a section within the characteristic quantity space; a large weighting is added to a candidate region corresponding to the section to which many votes were cast; then, the candidate region in which the weighting value exceeds the specified threshold value is selected as the region having a high probability of being the specified image subject; finally, the information is sent to the setting site 72B.

Based on the prescanned data, the setting site 72B constructs density histograms of the image, calculates image characteristic quantities such as highlights and shadows and performs any other necessary operations to set the reading conditions for fine scan, which are then supplied to the scanner 12. In addition to the construction of density histograms and the calculation of image characteristic quantities, the setting site 72B, in response to the specified image subject extracted by the principal part extracting site 72A and commands optionally entered by the operator, sets the conditions for the image processing steps to be done in the image data processing subsection 66 and sends them to the parameter coordinating subsection 76.

Upon receiving the image processing conditions, the parameter coordinating subsection 76 sets them at a specified site (hardware) in the prescanned image processing section 56 and the fine scanned image processing section 58.

If verification is to be performed, the image data processing subsection 62 reads the prescanned data from the prescan memory 52, processes it and subsequently converts the processed data to a suitable form in the image data converting subsection 64. The converted data is represented as a simulated image on the display 20.

Looking at the representation on the display 20, the operator checks (verifies) the image, or the result of the processing and, if necessary, manipulates the aforementioned keys on the keyboard 18a or the mouse 18b to adjust the color, density, gradation and other features of the image.

The inputs for this adjustment are sent to the key correcting subsection 74 which, in response to the entered inputs for adjustment, calculates the amounts of correction of the image processing conditions and sends them to the parameter coordinating subsection 76. In response to the supplied amounts of correction, the parameter coordinating subsection 76 corrects the LUTs, MTXs and other conditions in the image data processing subsections 62 and 66 as already described above. The image represented on the display 20 also varies in response to this corrective measure, or the inputs for adjustment entered by the operator.

If the operator concludes that the image in the frame of interest represented on the display is appropriate (verification OK), the operator manipulates the keyboard 18a or the mouse 18b to give a command for print start, whereupon the image processing conditions are finalized and set in the scanner 12 in accordance with the reading conditions for fine scan including the stop-down value of the variable diaphragm 24 and, at the same time, carrier 30 transports the film F at a suitable speed, whereby fine scan gets started.

If no image verification is to be performed, the image processing conditions are finalized at the point of time when the parameter coordinating subsection 76 ends setting of the image processing conditions in the fine scanned image processing section 58, whereby fine scan gets started.

Fine scan is performed in essentially the same manner as prescan except that the reading conditions are those for fine scan including the stop-down value of the variable diaphragm 24; the output signals from the image sensor 34 are amplified with the amplifier 36, converted to digital form in the A/D converter 38, processed by the data processing section 48 in the image processing apparatus 14, converted to fine scanned data in the log converter 50 and sent to the fine scan memory 54.

The fine scanned data being sent to the fine scan memory 54 is read by means of the fine scanned image processing section 58, processed under the image processing conditions finalized in the image data processing subsection 66 and subsequently converted to output image data in the image data converting subsection 68 before it is sent to the printer 16.

The printer 16 is the combination of a printer (printing or exposing apparatus) that records a latent image on a light-sensitive material (photographic paper) by exposing it in accordance with the supplied image data and a processor (developing apparatus) that performs specified processing steps on the exposed light-sensitive material and which outputs it as a print. To give one example of the printer's operation, the light-sensitive material is cut to a specified length in accordance with the size of the final print; thereafter, the printer records a back print and three light beams for exposure to red (R), green (G) and blue (B) in accordance with the spectral sensitivity characteristics of the light-sensitive material are modulated in accordance with the image data outputted from the image processing apparatus 14; the three modulated light beams are deflected in the main scanning direction while, at the same time, the light-sensitive material is transported in the auxiliary scanning direction perpendicular to the main scanning direction so as to record a latent image by two-dimensional scan exposure with said light beams. The latent image bearing light-sensitive material is then supplied to the processor. Receiving the light-sensitive material, the processor performs a wet development process comprising color development, bleach-fixing and rinsing; the thus processed light-sensitive material is dried to produce a print; a plurality of prints thus produced are sorted and stacked in specified units, say, one roll of film.

In the embodiment described above, we mentioned to extract a human face as the specified image subject. The present invention is not however limited thereto, and other subjects than the human face, as exemplified by an animal such as a pet, a car, a mountain or a lake may be extracted as the specified image subject. In this case, an extracting algorithm using a color or shape suitable for the selected specified image subject need be selected.

In the above case, we mentioned to extract a specified image subject in one frame. This is not however the sole case of the present invention, and the analogy with the extracting region (area) of the subject in another frame of the same film roll may be used in weighting each subject on the extracting region (area) in the weighting/evaluating processing section of the extracting unit.

That is, the analogy of the extracting region of the specified image subject in the previous frame with that in the frame which is now extracted may be used to perform weighting of the specified image subject of the current frame on its extracting region. For example, a template matching-like analogy can be seen after the magnitude of the extracting region is normalized. Alternatively, a histogram of the extracting region can be taken to see the analogy of the density distribution. The image analogy can also be seen by image characteristic quantities of color or other factors. Thus, the analogy with another frame of the same film roll can be used to also shorten the operation time required for extracting specified image subjects.

While the method and device of the present invention for extracting specified image subjects has been described above in detail, it should be understood that the invention is by no means limited to the aforementioned examples and that various improvements and modifications are possible without departing from the area and spirit of the invention.

As described above in detail, according to the present invention, specified image subjects can be extracted with photoprinters, such as digital photoprinters and the like, in high precision and with satisfactory efficiency in a consistent but flexible manner that is compatible with various states of original images. As a result, high-quality prints reproducing high-quality images can be produced with satisfactory efficiency.

What is claimed is:

1. A method of extracting a specified image subject which implements a plurality of specified image subject extracting algorithms in each stage of a plurality of stages by means of parallel processing, comprising the steps of:

managing respective extracting states of said plurality of specified image subject extracting algorithms in said each stage;

qualifying respective extraction processing conditions of said plurality of specified image subject extracting algorithms in a subsequent stage according to the respective extracting states in a precedent stage; and implementing said plurality of specified image subject extracting algorithms of said subsequent stage under the thus qualified respective extraction processing conditions by means of parallel processing, wherein said precedent stage comprises extracting a shape of regular geometric form of the specified image subject.

2. The method of extracting the specified image subject according to claim 1, wherein said respective extraction processing conditions are areas to be subjected to extraction processing when implementing said plurality of specified image subject extracting algorithms of said subsequent stage.

3. The method of extracting the specified image subject according to claim 1, wherein said respective extraction processing conditions are types of extracting algorithms to be implemented at said subsequent stage.

4. The method of extracting the specified image subject according to claim 1, wherein said respective extraction processing conditions are control parameters inside extracting algorithms to be implemented in said subsequent stage.

5. The method of extracting the specified image subject according to claim 1, wherein said plurality of specified image subject extracting algorithms to be implemented by means of parallel processing in said each stage are of same combination in said plurality of stages.

6. The method of extracting the specified image subject according to claim 1, wherein said plurality of specified image subject extracting algorithms to be implemented by means of parallel processing in said each stage are of different combination in said plurality of stages.

7. The method of extracting a specified image subject according to claim 1, wherein said extraction processing conditions comprise electronic flash or backlight information.

8. The method of extracting a specified image subject according to claim 1, wherein the plurality of specified image subject extracting algorithms in each stage of the plurality of stages are implemented at a same time.

9. The method of extracting a specified image subject according to claim 1, wherein said image subject extraction parallel processing units comprises:

skin color extraction, face contour extraction, hair-on-head extraction, eye/nose/mouth/eyebrow extraction, body extraction, and non-background area extraction.

10. The method of extracting a specified image subject according to claim 1, wherein said algorithms comprise different degrees of resolution.

11. A method of extracting a specified image subject according to claim 1, wherein said regular geometric form is circular or elliptical.

12. A method of extracting a specified image subject according to claim 1, wherein said qualifying respective extraction processing conditions of said plurality of specified image subject extracting algorithms in the subsequent stage is performed after the respective extracting states in the precedent stage.

13. A device for extracting a specified image subject, comprising:

a plurality of stages of image subject extraction parallel processing units, each image subject extraction parallel processing unit for implementing a plurality of specified image subject extracting algorithms in each stage of said plurality of stages by means of parallel processing; and a control unit for managing respective image subject extraction states of said plurality of specified image subject extracting algorithms in each stage by said each image subject extraction parallel processing unit of said image subject extraction parallel processing units and qualifying respective extraction processing conditions of said plurality of specified image subject extracting algorithms in a subsequent stage of an image subject extraction parallel processing unit according to the respective image subject extraction states by the precedent stage of the image extraction parallel processing unit, wherein said precedent stage comprises extracting a shape of regular geometric form of the specified image subject.

14. The device for extracting the specified image subject according to claim 13, wherein said control unit qualifies areas to be subjected to extraction processing in said subsequent stage of said image subject extraction parallel processing unit as said respective extraction processing conditions.

15. The device for extracting the specified image subject according to claim 13, wherein said control unit qualifies types of extracting algorithms to be implemented in said subsequent stage of said image subject extraction parallel processing unit as said respective extraction processing conditions.

16. The device for extracting the specified image subject according to claim 13, wherein said control unit qualifies control parameters inside extracting algorithms to be implemented by said subsequent stage of said image subject extraction parallel processing unit as said respective extraction processing conditions.

17. The device for extracting the specified image subject according to claim 13, wherein said image subject extraction parallel processing unit implements said plurality of specified image subject extracting algorithms with same combination in each stage of said plurality of stages by means of parallel processing.

18. The device for extracting the specified image subject according to claim 13, wherein said image subject extraction parallel processing unit implements said plurality of specified image subject extracting algorithms with different combination in each stage of said plurality of stages by means of parallel processing.

19. The device for extracting a specified image subject according to claim 13, wherein said extraction processing conditions comprise electronic flash or backlight information.

20. The device for extracting a specified image subject according to claim 13, wherein the plurality of specified image subject extracting algorithms in each stage of the plurality of stages are implemented at a same time.

21. The device for extracting a specified image subject according to claim 13, wherein said image subject extraction parallel processing units comprises:

skin color extraction, face contour extraction, hair-on-head extraction, eye/nose/mouth/eyebrow extraction, body extraction, and non-background area extraction.

22. The device for extracting a specified image subject according to claim 13, wherein said algorithms comprise different degrees of resolution.

23. A device for extracting a specified image subject according to claim 13, wherein said regular geometric form is circular or elliptical.

24. A device for extracting a specified image subject, according to claim 13, wherein the control unit for managing respective image subject extraction states of said plurality of specified image subject extracting algorithms in each stage by said each image subject extraction parallel processing unit of said image subject extraction parallel processing units and qualifying respective extraction processing conditions of said plurality of specified image subject extracting algorithms in the subsequent stage of the image subject extraction parallel processing unit is performed after the extraction of the respective image subject extraction states by the precedent stage of the image extraction parallel processing unit.

25. The device for extracting the specified image subject according to claim 14, wherein said control unit checks a degree of a overlap of each of candidate areas of said specified image subject which is extracted by a plurality of said specified image subject extracting algorithm, qualifies a candidate area in which the degree of the overlap exceeds a predetermined value as being said areas, and controls said image subject extraction parallel processing units to extract a undetected related information.

26. The device for extracting the specified image subject according to claim 15, wherein said control unit checks composing elements of a specified image subject extracted by a plurality of the specified image subject extracting algorithms, and qualifies the types of extracting algorithms to be implemented in said subsequent stage to extract undetected other composing elements.

* * * * *